(12) United States Patent
Bayer et al.

(10) Patent No.: US 10,100,168 B2
(45) Date of Patent: Oct. 16, 2018

(54) RECOVERY OF ADDITIVE MANUFACTURING SUPPORT MATERIALS

(71) Applicant: Dow Global Technologies LLC, Midland, MI (US)

(72) Inventors: Roland Bayer, Walsrode (DE); Scott T. Matteucci, Midland, MI (US); Aleksander J. Pyzik, Midland, MI (US); Sharon Allen, Midland, MI (US); Mary Anne Leugers, Midland, MI (US); Daniel L. Dermody, Midland, MI (US); Robert S. Moglia, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 70 days.

(21) Appl. No.: 15/108,921

(22) PCT Filed: Jan. 9, 2015

(86) PCT No.: PCT/US2015/010749
§ 371 (c)(1),
(2) Date: Jun. 29, 2016

(87) PCT Pub. No.: WO2015/108770
PCT Pub. Date: Jul. 23, 2015

(65) Prior Publication Data
US 2016/0333165 A1    Nov. 17, 2016

Related U.S. Application Data

(60) Provisional application No. 62/079,286, filed on Nov. 13, 2014, provisional application No. 61/928,015, filed on Jan. 16, 2014.

(51) Int. Cl.
| | | |
|---|---|---|
| B29C 67/00 | (2017.01) | |
| B33Y 40/00 | (2015.01) | |
| B33Y 70/00 | (2015.01) | |
| C08J 11/08 | (2006.01) | |
| B29C 64/40 | (2017.01) | |
| B29C 64/135 | (2017.01) | |

(52) U.S. Cl.
CPC ............. *C08J 11/08* (2013.01); *B29C 64/135* (2017.08); *B29C 64/40* (2017.08); *B33Y 40/00* (2014.12); *B33Y 70/00* (2014.12); *C08J 2301/26* (2013.01); *Y02W 30/701* (2015.05)

(58) Field of Classification Search
CPC ................................ B33Y 40/00; C08J 11/08
See application file for complete search history.

(56) References Cited

U.S. PATENT DOCUMENTS

| | | | |
|---|---|---|---|
| 4,316,982 A | 2/1982 | Holst et al. | |
| 5,121,329 A | 6/1992 | Crump | |
| 5,218,107 A * | 6/1993 | Schulz | ..................... C08B 11/20 536/100 |
| 5,503,785 A | 4/1996 | Crump et al. | |
| 6,070,107 A | 5/2000 | Lombardi et al. | |
| 6,228,923 B1 | 5/2001 | Lombardi et al. | |
| 6,790,403 B1 * | 9/2004 | Priedeman, Jr. | ........ B29C 41/36 264/308 |
| 2003/0107158 A1 * | 6/2003 | Levy | ...................... B29C 67/24 264/494 |
| 2006/0165625 A1 * | 7/2006 | Verrall | ..................... C08J 7/047 424/70.11 |
| 2016/0194492 A1 * | 7/2016 | Smith, Jr. | .............. B33Y 70/00 525/57 |

FOREIGN PATENT DOCUMENTS

| | | |
|---|---|---|
| EP | 210917 A2 | 2/1987 |
| EP | 1141029 B1 | 5/2003 |
| EP | 1423433 A1 | 6/2004 |
| EP | 0894818 B1 | 3/2005 |
| EP | 2514775 A1 | 10/2012 |
| WO | 0062994 A1 | 10/2000 |
| WO | 2006020279 A2 | 2/2006 |
| WO | 2013165755 A1 | 11/2013 |

* cited by examiner

*Primary Examiner* — Colin W. Slifka

(57) ABSTRACT

The inventions is directed to a method for recovering support materials used in an additive manufacturing process. The method comprises exposing a precursor additive manufactured article comprised of a water soluble support polymer and an insoluble material to water. The water soluble support polymer is dissolved in the water. The remaining article is then removed from the water. The dissolved water soluble polymer is precipitated from the water. The precipitated polymer is separated from the water and any remaining water removed to recover the water soluble support polymer. The recovered water soluble support polymer may then be re-used to make further additive manufactured articles.

17 Claims, No Drawings

RECOVERY OF ADDITIVE MANUFACTURING SUPPORT MATERIALS

FIELD OF THE INVENTION

The invention relates to a method of additive manufacturing utilizing support materials that must be subsequently removed to make the final additive manufactured part.

BACKGROUND OF THE INVENTION

Additive manufacturing of thermoplastic polymers (typically nylon) is well known. For example, fused filament fabrication (FFF), which is also commonly called plastic jet printing has been used to form 3d parts by using thermoplastic filaments that are drawn into a nozzle heated, melted and then extruded where the extruded filaments fuse together upon cooling (see, for example, U.S. Pat. No. 5,121,329). Because the technique requires melting of a filament and extrusion, the materials have been limited to thermoplastic polymers (typically nylon) and complex apparatus. In addition, the technique has required support structures that are also extruded when making complex parts that must survive the elevated temperature needed to form the part, while also being easily removed, for example, by dissolving it or releasing it by dissolving a layer between it and the final article such as described by U.S. Pat. No. 5,503,785.

Several polymeric materials that may be used to form support structures that may be dissolved in water have been described such as poly(2-ethyl-2-oxazoline) and impact modified terpolymers of styrene, methacrylic acid and butyl acrylate commercially available under BELLAND 88140 and a copolymer comprised of maleic anhydride such as described in U.S. Pat. No. 5,503,785 and European Patent Applications EP2514775; EP1773560 and EP1194274. U.S. Pat. No. 5,503,785 describes several other polymers that may be used as water soluble release layer for an underlying support structure. Because such polymers are dissolved in water and generally require other additives to function, they present a problem of disposal and recovery for additive manufacturing particularly as these methods become more widely used for production.

It would be desirable to provide a method to address the problem of disposal of polymers in waste streams arising from additive manufacturing such as described above.

SUMMARY OF THE INVENTION

A method for recovering support materials used in an additive manufacturing process, the method comprising,
(i) providing a precursor additive manufactured article comprised of a water soluble support polymer and an insoluble material,
(ii) exposing the precursor additive manufactured article to water such that the water soluble support polymer is dissolved in the water to form (a) an aqueous solution of the water soluble support polymer and water and (b) a finished additive manufactured article,
(iii) removing the final additive manufactured article from the aqueous solution,
(iv) precipitating the water soluble support polymer from the aqueous solution to form an insoluble precipitate of the water soluble support polymer,
(v) separating the precipitate from the water, and
(vi) removing any water remaining from the precipitate of the water soluble support polymer.

The method allows for the recovery of the support polymer for re-use in additive manufacturing processes or other uses.

DETAILED DESCRIPTION OF THE INVENTION

The precursor additive manufactured article provided may be any suitable one comprised of a water soluble support polymer and an insoluble material in which the water soluble support polymer is removed to form the finished or final additive manufactured article. The insoluble material, which ultimately defines the final additive manufactured article may be any that is insoluble in water. Generally, this means that the insoluble material is comprised of an insoluble polymer such as those known in the art such as polyamides, polycarbonates and the like and as described in U.S. Pat. No. 5,503,785; and European Patent Applications EP2514775; EP1773560 and EP1194274. The insoluble material may also be composites of such insoluble polymers and another material or additive such as those known in the art. For example, the insoluble polymer may have a ceramic or metal mixed with it in which the final additive manufactured article may be further processed to remove (thermally decompose or oxidize) the insoluble polymer and subsequently sintered into dense metal or ceramic articles.

The precursor additive manufactured article is also comprised of a water soluble support polymer. The water soluble support polymer may be any suitable one for the particular final additive manufactured article desired, such as, poly(2-ethyl-2-oxazoline), polyvinylalcohol, an impact modified terpolymer of styrene, methacrylic acid and butyl acrylate, a copolymer comprised of maleic anhydride, polyvinyl alcohol, a hydroxypropyl cellulose (HPC), a hydroxypropyl methylcellulose (HPMC), hydroxyethyl methylcellulose (HEMC) or combination thereof. Exemplary HPCs include those available from Ashland Inc., Ky. under the tradename KLUCEL.

In a particular embodiment, the water soluble support polymer is HPMC and desirably HPMC in the absence of any other additive. The hydroxypropyl methylcellulose has a cellulose backbone having $\beta$-1,4 glycosidically bound D-glucopyranose repeating units, designated as anhydroglucose units. The degree of the substitution of hydroxyl groups of the anhydroglucose units by methoxyl groups and hydroxypropoxyl groups is desirably as follows. The hydroxyl groups of the anhydroglucose units are desirably not substituted by any groups other than methoxyl and hydroxypropoxyl groups.

The average number of methoxyl groups per anhydroglucose unit is designated as the degree of substitution of methoxyl groups (herein "DS"). The term "hydroxyl groups substituted by methoxyl groups" is to be construed to include not only methylated hydroxyl groups directly bound to the carbon atoms of the cellulose backbone, but also methylated hydroxyl groups of hydroxypropoxyl substituents bound to the cellulose backbone.

The degree of the substitution of hydroxyl groups of the anhydroglucose units by hydroxypropoxyl groups is expressed by the molar substitution of hydroxypropoxyl groups (herein "MS"). The MS is the average number of moles of hydroxypropoxyl groups per anhydroglucose unit in the hydroxypropyl methylcellulose. It is to be understood that during the hydroxypropoxylation reaction, the hydroxyl group of a hydroxypropoxyl group bound to the cellulose backbone can be further etherified by a methylation agent and/or a hydroxypropoxylation agent. Multiple subsequent hydroxypropoxylation reactions with respect to the same carbon atom position of an anhydroglucose unit yields a side chain, wherein multiple hydroxypropoxyl groups are covalently bound to each other by ether bonds, each side chain as a whole forming a hydroxypropoxyl substituent to the cellulose backbone. The term "hydroxypropoxyl groups" thus has to be interpreted in the context of the MS as referring to the hydroxypropoxyl groups as the constituting units of hydroxypropoxyl substituents, which either comprise a single hydroxypropoxyl group or a side chain as outlined above, wherein two or more hydroxypropoxyl units are covalently bound to each other by ether bonding. Within this definition, it is not important whether the terminal hydroxyl group of a hydroxypropoxyl substituent is further methylated or not; both methylated and non-methylated hydroxypropoxyl substituents are included for the determination of MS.

The HPMC desirably has a DS of at least 1.0, preferably at least 1.4, more preferably at least 1.5, even more preferably at least 1.6, and most preferably at least 1.7. The HPMC generally has a DS of up to 2.7, more typically up to 2.5, and even more typically up to 2.4, and most typically up to 2.1.

The HPMC desirably has an MS of at least 0.6, preferably at least 0.7, and more preferably at least 0.8. The HPMC generally has an MS of up to 1.9, typically up to 1.7, more typically up to 1.5, even more typically up to 1.3, and most typically up to 1.1.

The determination of the % methoxyl and % hydroxypropoxyl is carried out according to the United States Pharmacopeia (USP 35, "Hypromellose", pages 3467-3469). The values obtained are % methoxyl and % hydroxypropoxyl. These are subsequently converted into degree of substitution (DS) for methoxyl substituents and molar substitution (MS) for hydroxypropoxyl substituents. Residual amounts of salt are taken into account in the conversion.

The hydroxypropyl methylcellulose desirably has a viscosity of up to 100 mPa·s, more preferably up to 60 mPa·s, even more preferably up to 40 mPa·s, and most preferably up to 30 mPa·s, or up to 20 mPa·s, or up to 10 mPa·s, determined as a 2% by weight solution in water at 20° C. in a Haake VT550 Viscotester at a shear rate of 2.55 s-1. The viscosity is preferably at least 1.2 mPa·s, and more preferably at least 2.4 mPa·s or at least 3 mPa·s. Hydroxypropyl methylcelluloses of such viscosity can be obtained by subjecting a hydroxypropyl methylcellulose of higher viscosity to a partial depolymerization process. Partial depolymerization processes are well known in the art and described, for example, in European Patent Applications EP 1,141,029; EP 210,917; EP 1,423,433; and U.S. Pat. No. 4,316,982.

The water soluble polymer may include other additives such as those known in the art. Such additives or constituents may include, for example, inorganic fillers, plasticizers, lubricants, surfactants, stabilizers, and antioxidants. When inorganic fillers are used, they tend to be insoluble in water and such insoluble constituents may be separately recovered as described below. It is desirable for the water soluble support polymer to be free of other additives that may require separate recovery.

Plasticizers, however, may be used if certain properties are desired for use in a particular additive manufacturing method to be employed. Plasticizer that may be used include those known in the art. The plasticizer may be soluble or insoluble in water and is not particularly limited. Examples of plasticizers include triethylcitrate, dibutylsebacate, sorbitol and triacetin.

The precursor additive manufactured article is exposed to water to dissolve the water soluble support polymer. The precursor article may be exposed to water by any suitable method such as spraying, washing, submersing or combination thereof. Generally, it is desirable to agitate the water. Ultrasonic agitation is particularly useful alone or in combination with other agitation. Depending on the water soluble support polymer used, the water may be heated, cooled, pH adjusted, or combination thereof to increase the solubility or rate of dissolution of the water soluble polymer. In an embodiment, the precursor manufactured article may be submersed in more than one water-containing vessel to shorten the total time to remove all of the water soluble polymer. In a preferred embodiment, the water soluble support polymer is HPMC. It has been surprisingly discovered that the rate of dissolution of HPMC when performed at or near a neutral pH (e.g., about pH 7±1) the rate of dissolution is greatest. Likewise, it has been discovered that at a temperature near ambient (e.g., about 23° C.±5° C.) the HPMC dissolution is greatest and is the most when both these conditions are used.

Once all of the water soluble support polymer is removed, the finished additive article may be removed from being exposed to water, dried and subject to further processes if desired, for example, painted or as described above.

The dissolved water soluble support polymer in the water (aqueous solution) is precipitated from the aqueous solution. Precipitation may be carried out by changing the pH, adding a salt, changing the temperature of the aqueous solution or combination thereof. Typically, when the pH is changed, it is changed by at least about 3 pH numbers (e.g., pH 10 to 7). Preferably, the pH is changed by at least 4 or 5 pH numbers.

A salt may also be used to precipitate or aid in the precipitation of the water soluble support polymer. Typical salts that may be useful depending on the particular water soluble support polymer to be precipitated may include a metal or ammonium salt of a nitrate, sulfate, halide (e.g., chloride). Preferably, the salt has a cation that is multivalent such as +2, +3 or even +4. Exemplary multivalent cations include alkaline earths (Mg), Al, and transition metals. The amount of salt may be any useful to facilitate the precipitation of the dissolved polymer. Typically, the amount may be an amount that results in the aqueous solution having a Molarity of a few fraction (e.g., 0.05 to 1) or 1 or more Molarity to the supersaturation Molarity for the salt in water.

Typically, when the temperature of the water is changed to precipitate the water soluble support polymer, it is cooled from an elevated temperature useful for dissolving the water soluble support polymer such as polyvinylalcohol and poly (2-ethyl-2-oxazoline). For example, if the temperature used to dissolve the water soluble support polymer is elevated from about 60° C. to 100° C. the temperature may be cooled to ambient conditions (e.g., 20° C. to 30° C.).

In a particular embodiment, it has been surprisingly found that the precipitation of HPMC may be advantageously precipitated by raising the temperature from ambient (e.g., ~23° C.), adding salt or combination thereof. This combined with HPMC being easily dissolved in room temperature water, particularly with ultrasonic agitation, while also not needing further additives makes HPMC a surprisingly suitable support material for the precursor additive manufactured article. Even though it may be raised to a higher temperature (close to 100° C.), the temperature of the HPMC containing aqueous solution may only be raised a few degrees or 10° C. to 40° C. The particular temperature useful to precipitate the HPMC surprisingly decreases with increasing concentration. Consequently, it is preferable to dissolve as much HPMC as possible to raise the concentration allowing the reduction of the precipitation temperature. Likewise, it may be useful to concentrate the HPMC in the aqueous solution, such as merely allowing the evaporation with or without the application of heat.

If the aqueous solution also comprises insoluble compounds present in the water soluble support material, after dissolution of said polymer, the insoluble constituents may first be separated from the aqueous solution or separated at the same time as the precipitated polymer. Separation may be carried out by any suitable method such as those known in the art. Examples of methods that may be applicable are filtration, flotation, centrifugation, sedimentation and screening. Once the precipitate and any other constituents are separated, they may be washed and purified if need be. Once completed, the recovered polymer and any other constituent is further treated to remove remaining undesired water (some small amount is generally not detrimental (e.g., less than 1% by weight water to some trace amount) and compounded (mixed and heated) and reformed into suitable geometries for use in the particular additive manufacturing apparatus to be used. The remaining water may be removed during the heating and kneading/mixing as the case to compound or shape the polymer into the useful shape.

In a particular embodiment, the aqueous solution containing a salt used to precipitate the water soluble support polymer after being separated from the precipitated polymer, may be re-used to add salt to subsequent aqueous solutions containing the water soluble support polymer. Prior to being re-used, the concentration of the salt containing aqueous solution may be concentrated, for example, by evaporating a portion of the water.

EXAMPLES

Example 1

Filaments for three-dimensional printing are produced from two different hydroxypropyl methylcellulose (HPMC) powder samples having a DS (methyl), a MS (hydroxypropoxyl) and a viscosity as listed in Table 1 below. The HPMC samples are prepared using a known method for etherification of alkalized cellulose. The etherification agents methyl chloride and propylene oxide are added to alkali cellulose and reacted at elevated temperatures. The resulting crude HPMC is neutralized, washed free of chloride using hot water, dried and ground. The produced HPMC is subjected to partial depolymerization by heating the HPMC powder with gaseous hydrogen chloride at a temperature of 60 to 85° C. for 80 to 100 minutes.

The determination of the % methoxyl and % hydroxypropoxyl is carried out according to the United States Pharmacopeia (USP 35, "Hypromellose", pages 3467-3469). These are subsequently converted into degree of substitution (DS) for methoxyl substituents and molar substitution (MS) for hydroxypropoxyl substituents. The viscosity of the HPMC samples is determined as a 2% by weight solution in water at 20° C. in a Haake VT550 Viscotester at a shear rate of 2.55 s-1.

TABLE 1

| HPMC | DS (methyl) | MS (hydroxypropoxyl) | 2% Viscosity in water at 20° C. (mPa · s) |
|---|---|---|---|
| HPMC | 2.2 | 1.2 | 40 |

A capillary rheometer (Malvern RH10, Malvern Instruments) equipped with a die which is suitable to produce HPMC filaments of 1.8 mm is heated up to 175° C. in the case of HPMC-1 or 145° C. in the case of HPMC-2 and filled with the HPMC powder. The vertical extrusion through the die is performed with a piston driving at about 5 mm/min. The resulting spaghetti-like filaments of 1.8 mm diameter are hardened by cooling to room temperature. They are subsequently used for the 3-D-printing step without any further treatment.

A 3D Printer MakerBot Replicator 2X, which is commercially available from Stratasys Ltd, Minneapolis, Minn. (USA), was used to print cubes of the HPMC.

Approximately 6 grams of the 3D printed HPMC parts were placed in a beaker with 400 grams of water and ultrasonically agitated until the parts were dissolved. The solution was heated to 80° C. The solution changed from clear to opaque due to particles precipitating from the solution.

A portion of the opaque solution was passed through 230 mesh screen and another portion was passed through a 450 mesh screen. Each of the screens had a filter cake of material. The screens were heated to 110° C. until dry. Each screen had a film which was easily removed. The film was confirmed to be HPMC and had the same thermal behavior as the original HPMC as determined by Thermogravimetric analysis.

The invention claimed is:

1. A method for recovering support materials used in an additive manufacturing process, the method comprising,
    (i) providing a precursor fused filament fabrication additive manufactured article comprised of a water soluble support polymer and an insoluble material,
    (ii) exposing the precursor additive manufactured article to water such that the water soluble support polymer is dissolved in the water to form (a) an aqueous solution of the water soluble support polymer and water and (b) a finished additive manufactured article,
    (iii) removing the final additive manufactured article from the aqueous solution,
    (iv) precipitating the water soluble support polymer from the aqueous solution to form a precipitate of the water soluble support polymer,
    (v) separating the precipitate from the water, and
    (vi) removing any water remaining from the precipitate of the water soluble support polymer,
    wherein the water soluble support polymer is a hydroxypropyl cellulose (HPC), a hydroxypropyl methylcellulose (HPMC), hydroxyethyl methylcellulose (HEMC) or combination thereof.

2. The method of claim 1, wherein the precipitating is carried out by changing the pH, adding a salt, changing the temperature of the aqueous solution or combination thereof.

3. The method of claim 1, wherein the water soluble support polymer is the hydroxypropyl methylcellulose.

4. The method of claim 3, wherein hydroxypropyl methylcellulose has a degree of substitution of methoxyl groups of at least 1.0 and a molar substitution of hydroxypropoxyl groups of at least 0.6.

5. The method of claim 4, the hydroxypropyl methylcellulose has no further constituents.

6. The method of claim 4 wherein the precipitating comprises adding a salt to the aqueous solution.

7. The method of claim 6, wherein at least a portion of the salt is re-used for precipitating without removing it from the aqueous solution.

8. The method of claim 4, wherein the hydroxypropyl methylcellulose is dissolved in water that is at or near a neutral pH.

9. The method of claim 8, wherein the hydroxypropyl methylcellulose is dissolved in water having a temperature at or near ambient temperature.

10. The method of claim 1, wherein the water soluble support polymer has no further constituents.

11. The method of claim 1, wherein the water soluble support polymer is further comprised of a filler.

12. The method of claim 11, wherein said filler and precipitate are simultaneously separated and compounded after drying to reform the water soluble support polymer comprised of the filler.

13. The method of claim 11, wherein said filler and precipitate are separated and any remaining water removed individually and then compounded together to reform the water soluble support polymer comprised of the filler.

14. The method of claim 11, wherein the filler is an insoluble filler.

15. The method of claim 1, wherein the precipitating is carried out by changing the temperature, changing the pH or combination thereof of the aqueous solution.

16. The method of claim 15, wherein the precipitating is carried out by changing the temperature of the aqueous solution.

17. The method of claim 16, wherein the water soluble support polymer is the hydroxypropyl methylcellulose.

\* \* \* \* \*